US012610434B2

(12) United States Patent
Park et al.

(10) Patent No.:    US 12,610,434 B2
(45) Date of Patent:         Apr. 21, 2026

(54) COOKING APPLIANCE COFFEE ROASTING PAN

(71) Applicant: Haier US Appliance Solutions, Inc., Wilmington, DE (US)

(72) Inventors: Ju Chan Park, Seongnam-si (KR); Youngjin Oh, Seoul (KR); Hyuk-Chul Kwon, Seongnam (KR); Byung Cheon Lee, Seongnam-si (KR); Hwanjae Yeo, Seoul-si (KR); Kyung-Ho Choo, Seongnam-si (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 959 days.

(21) Appl. No.: 17/726,654

(22) Filed: Apr. 22, 2022

(65) Prior Publication Data

US 2023/0345589 A1      Oct. 26, 2023

(51) Int. Cl.
*H05B 6/64*          (2006.01)
*A23N 12/08*         (2006.01)
*A23N 12/10*         (2006.01)

(52) U.S. Cl.
CPC ......... *H05B 6/6411* (2013.01); *A23N 12/083* (2013.01); *A23N 12/10* (2013.01)

(58) Field of Classification Search
CPC ................. A23N 12/083; A23N 12/10; G02B 2027/0138; G02B 2027/0178; G02B 27/0101; G02B 27/017; G02C 11/10; G02C 2200/08; G02C 5/008; G02C 7/083; H05B 6/6411; H05B 6/6485; H05B 6/6488

USPC .......................................................... 219/746
See application file for complete search history.

(56) References Cited

U.S. PATENT DOCUMENTS

| | | | | |
|---|---|---|---|---|
| 4,773,317 A | * | 9/1988 | Wickboldt, Jr. | ..... B01F 27/0725 |
| | | | | 99/348 |
| 5,117,079 A | * | 5/1992 | Morino | ..................... H05B 6/80 |
| | | | | 219/754 |
| 5,360,965 A | * | 11/1994 | Ishii | ..................... H05B 6/6455 |
| | | | | 219/754 |
| 5,520,099 A | * | 5/1996 | Chung | ..................... A23L 5/15 |
| | | | | 219/731 |
| 2004/0251250 A1 | * | 12/2004 | Haedrich | ............. H05B 6/6411 |
| | | | | 219/726 |

(Continued)

FOREIGN PATENT DOCUMENTS

| | | |
|---|---|---|
| JP | 2006234332 A | 9/2006 |
| JP | 2012090616 A | 5/2012 |

(Continued)

*Primary Examiner* — Steven W Crabb
*Assistant Examiner* — Ket D Dang
(74) *Attorney, Agent, or Firm* — Dority & Manning, P.A.

(57)                    ABSTRACT

A cooking appliance and a roasting assembly configured to be removably mounted within such cooking appliance are provided. The roasting assembly includes a pan defining an internal volume. The pan is configured to be rotatably mounted on a floor of a cooking chamber of the cooking appliance. The roasting assembly also includes a stirrer rod positioned within the internal volume of the pan. The stirrer rod is configured to be coupled to a rotating hub of the cooking appliance whereby the stirrer rod rotates with the rotating hub. The pan rotates at a first speed and the stirrer rod rotates at a second speed different from the first speed.

14 Claims, 12 Drawing Sheets

(56)     References Cited

U.S. PATENT DOCUMENTS

2011/0048246 A1 *  3/2011  Chang .................. F24C 15/322
                                                99/348
2014/0299006 A1 *  10/2014  Fleuren .............. A47J 43/0705
                                                99/513

FOREIGN PATENT DOCUMENTS

KR        20170023467  A  *  3/2017   ......... B65D 81/3453
WO      WO2008087622  A2      7/2008

* cited by examiner

214

244

234

226

208

202

156

156

150

172

COOKING APPLIANCE COFFEE ROASTING PAN

FIELD OF THE INVENTION

The present subject matter relates generally to cooking appliances, and more particularly to cooking appliances and accessories therefor which include features for cooking food items with automated stirring.

BACKGROUND OF THE INVENTION

Over the past several decades, microwave cooking appliances (i.e., microwave appliances) have become a staple appliance for many, if not most kitchens. Generally, microwave appliances include a cabinet that defines a cooking chamber for receipt of food items for cooking. In order to provide selective access to the cooking chamber and to contain food items and cooking energy (e.g., microwaves) during a cooking operation, a door is further included that is typically pivotally mounted to the cabinet. During use, a magnetron can generate the microwave radiation or microwaves that are directed specifically to the cooking chamber. The microwave radiation is typically able to heat and cook food items within the cooking chamber faster than would be possible with conventional cooking methods using direct or indirect heating methods. Moreover, since microwave appliances are often smaller than other appliances (e.g., a conventional baking oven) within a kitchen, microwave appliances are often preferable for heating relatively small portions or amounts of food.

Microwave heating is inherently uneven as the intensity of microwave fields directed into the cooking chamber varies unpredictably throughout the cooking chamber during microwave heating. Accordingly, some microwave ovens include features for rotating food items during cooking therein, such that the inherent variability of the microwave heating is ameliorated and the food items may be heated more evenly. However, it is desired for some food items and some cooking processes to have even greater consistency in heating than is provided by such current systems.

As a result, it would be advantageous to provide cooking appliances and assemblies therefor which can promote further relocation and/or redistribution of food items during cooking within the cooking appliance, such as automated stirring of the food items during cooking within the cooking appliance.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooking appliance is provided. The cooking appliance includes a cabinet that defines a cooking chamber. The cooking appliance also includes a microwave module mounted within the cabinet. The microwave module is positioned and configured for delivering microwave energy into the cooking chamber. The cooking appliance also includes a motor and a rotating hub mounted to the motor whereby the motor drives rotation of the rotating hub. The cooking appliance further includes a ring assembly rotatably mounted on a floor of the cooking chamber. The cooking appliance also includes a pan defining an internal volume. The pan is mounted on the ring assembly for rotation therewith. The cooking appliance further includes a stirrer rod positioned within the internal volume of the pan. The stirrer rod is coupled to the rotating hub whereby the stirrer rod rotates with the rotating hub. The pan rotates at a first speed and the stirrer rod rotates at a second speed different from the first speed.

In another exemplary aspect of the present disclosure, a roasting assembly configured to be removably mounted within a cooking appliance is provided. The roasting assembly includes a pan defining an internal volume. The pan is configured to be rotatably mounted on a floor of a cooking chamber of the cooking appliance. The roasting assembly also includes a stirrer rod positioned within the internal volume of the pan. The stirrer rod is configured to be coupled to a rotating hub of the cooking appliance whereby the stirrer rod rotates with the rotating hub. The pan rotates at a first speed and the stirrer rod rotates at a second speed different from the first speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
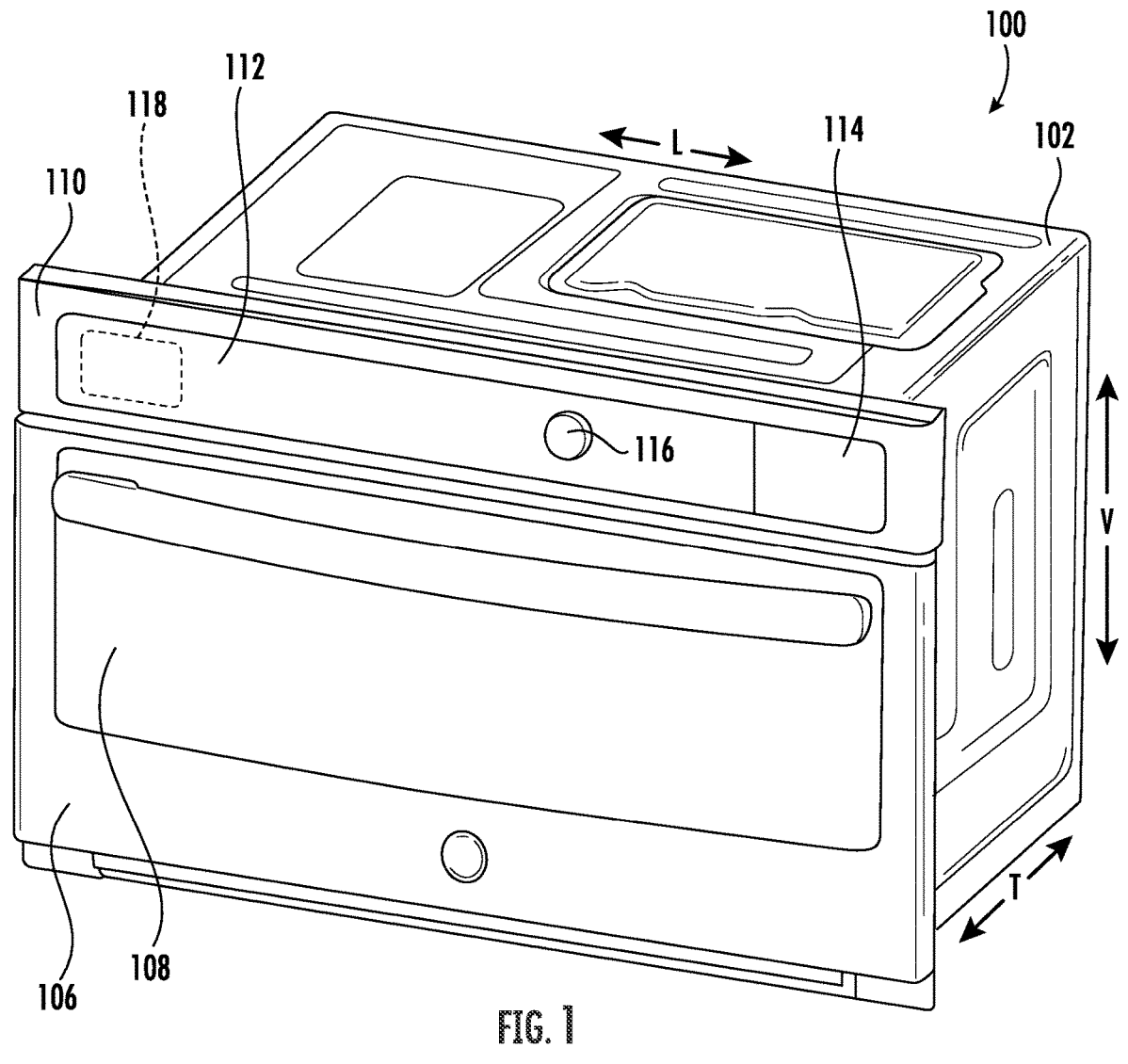
FIG. 1 provides a perspective view of a cooking appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Furthermore, as used herein, terms of approximation, such as "approximately," "substantially," or "about," refer to being within a ten percent margin of error.

Figure 2:
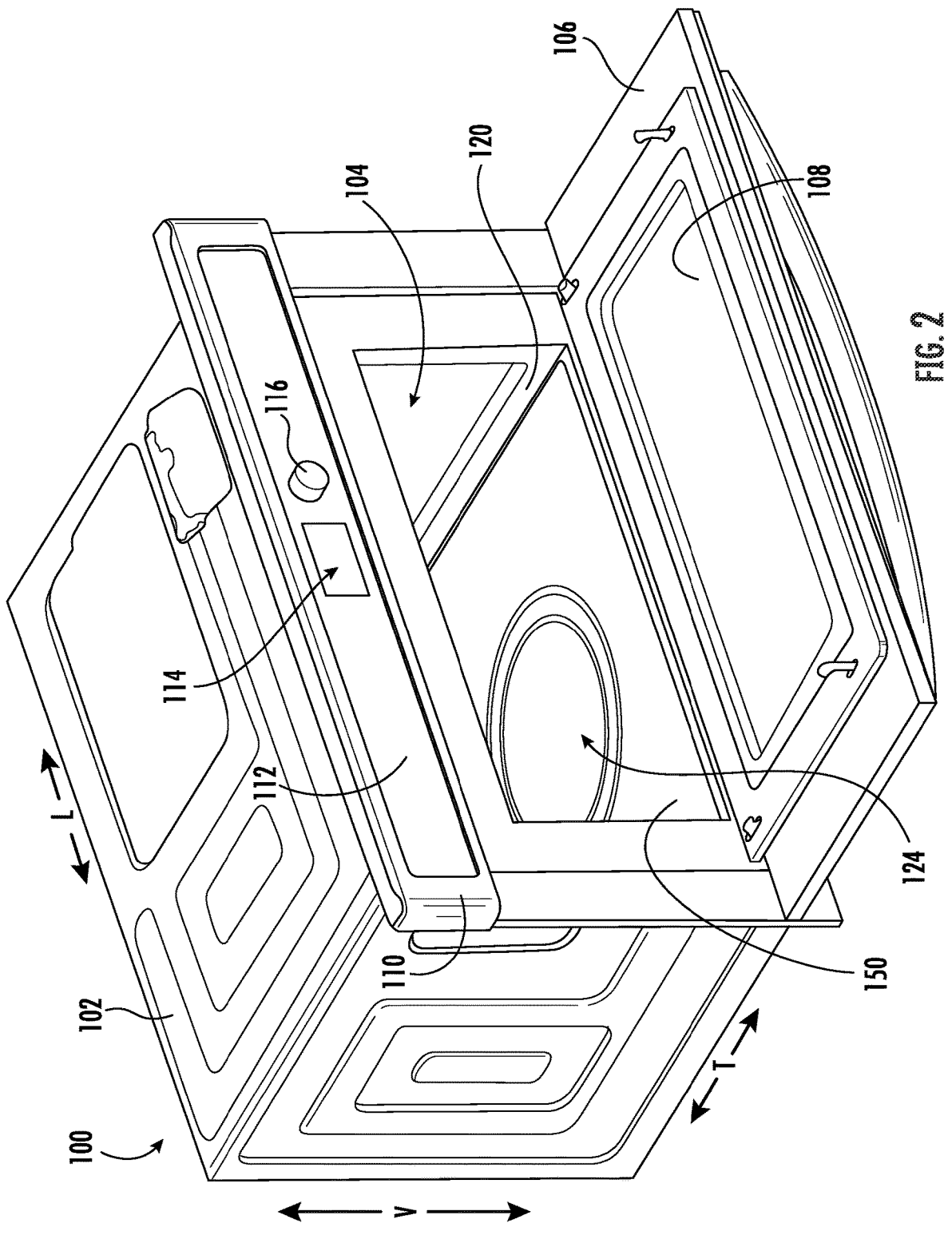
FIG. 2 provides a perspective view of the exemplary cooking appliance of FIG. 1, wherein the door is an open position.
Figure 3:
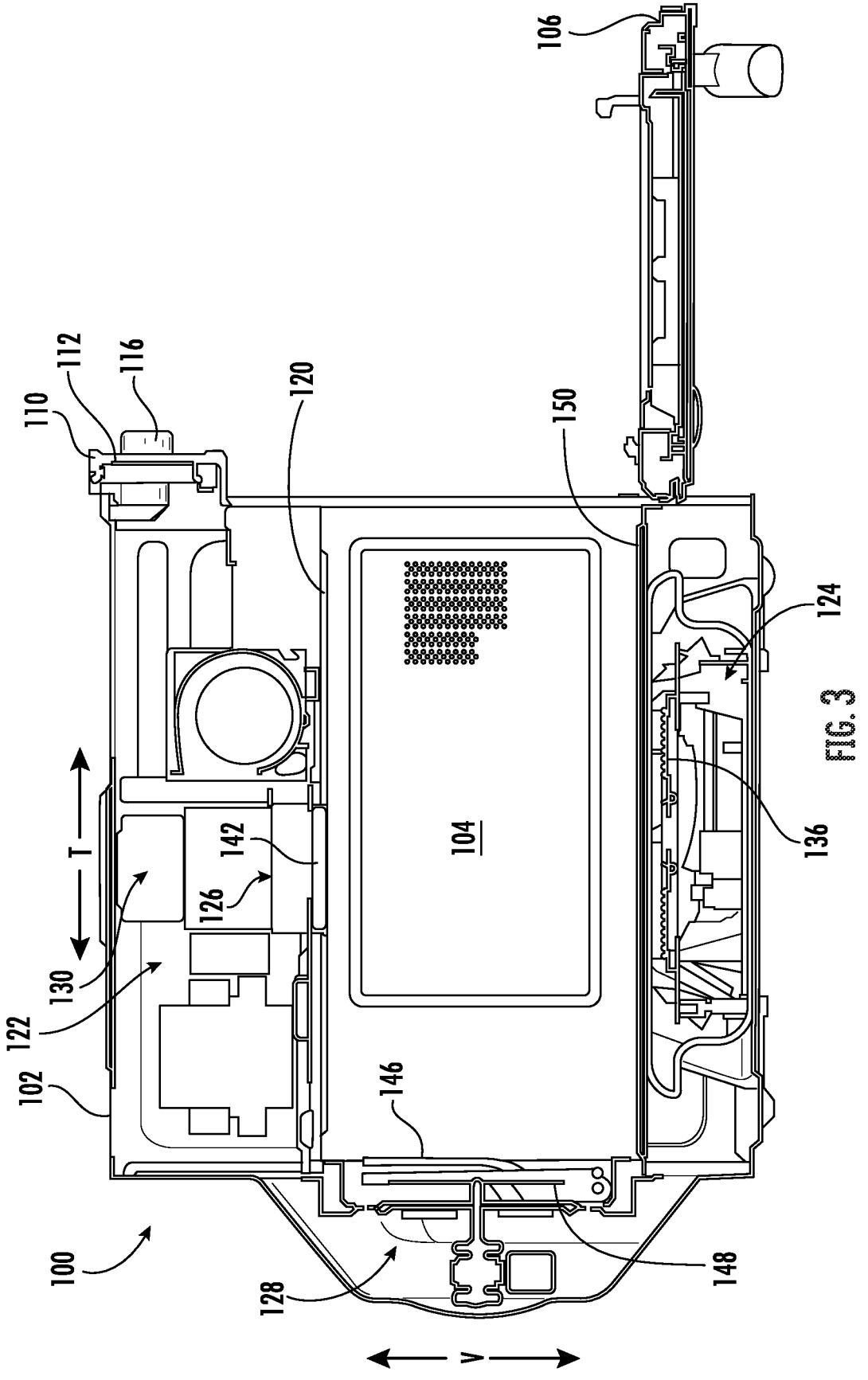
FIG. 3 provides a sectional view of the exemplary cooking appliance of FIG. 2.

Turning now to the figures, FIGS. 1 through 3, various views are provided of a cooking appliance 100 according to exemplary embodiments of the present disclosure. Specifically, FIGS. 1 and 2 provide perspective views of cooking appliance 100 having a door 106 in an open position and a closed position, respectively. FIG. 3 provides a side, sectional view of cooking appliance 100, wherein door 106 is in the open position.

Generally, cooking appliance 100 includes a housing or cabinet 102 that defines a mutually-orthogonal vertical direction V, lateral direction L, and transverse direction T. Within cabinet 102, cooking appliance 100 defines a cooking chamber 104 in which food items can be received. In some embodiments, a door 106 is rotatably mounted to move between the open position and the closed position. As shown, the open position permits access to cooking chamber 104 while the closed position restricts access to cooking chamber 104. A window in door 106 may be provided (e.g., for viewing food items in the cooking chamber 104). Additionally or alternatively, a handle may be secured to door 106 (e.g., to rotate therewith). The handle can be formed of plastic, for example, and can be injection molded.

In certain embodiments, cooking appliance 100 includes a control panel frame 110 on or as part of cabinet 102. A control panel 112 may be mounted within control panel frame 110. Generally, control panel 112 includes a display device 114 for presenting various information to a user. Control panel 112 may also include one or more input devices (e.g., tactile buttons, knobs, touch screens, etc.). In optional embodiments, the input devices of control panel 112 include a knob or dial 116. Selections may be made by rotating dial 116 clockwise or counter-clockwise, and when the desired selection is displayed, pressing dial 116. For example, many meal cook cycles and other cooking algorithms can be preprogrammed in or loaded onto a memory device of a controller 118 of cooking appliance 100 for many different food items types (e.g., pizza, fried chicken, French fries, potatoes, etc.), including simultaneous preparation of a group of food items of different food types comprising an entire meal. Instructions or selections may be displayed on display device 114. In optional embodiments, display device 114 can be used as an input device. For instance, display device 114 may be a touchscreen device, as is understood.

In exemplary embodiments, cabinet 102 of cooking appliance 100 includes an inner shell 120. Inner shell 120 of cabinet 102 delineates the interior volume of cooking chamber 104. Optionally, the walls of shell may be constructed using high reflectivity (e.g., 72% reflectivity) stainless steel.

Cooking appliance 100 includes multiple cooking modules. In particular, cooking appliance 100 includes a microwave module 122 and a lower heater module 124 mounted within cabinet 102. In additional or alternative embodiments, cooking appliance 100 includes an upper heater module 126 or a convection module 128.

Generally, microwave module 122 includes a magnetron 130 mounted within the cabinet 102 (e.g., above cooking chamber 104) and in communication (e.g., fluid or transmissive communication) with the cooking chamber 104 to direct microwave radiation or microwaves thereto. In other words, the microwave module 122 delivers microwave radiation into cooking chamber 104.

Below microwave module 122, lower heater module 124 may be mounted within cabinet 102. For instance, lower heater module 124 may include a heating coil 136 mounted below cooking chamber 104. The heating coil 136 may be, e.g., an induction heating coil or a resistive heating coil. The heating coil 136 may be in communication (e.g., transmissive communication) with cooking chamber 104 for heating objects, e.g., food items and/or cooking utensils, positioned within the cooking chamber 104.

Upper heater module 126 can include one or more heating elements 142. For instance, upper heater module 126 can include one or more electric heating elements, such as a resistive heating element (e.g., sheathed resistive heater) or a radiant heating element (e.g., a halogen cooking lamp) in thermal communication with cooking chamber 104. Upper heater module 126 may be mounted within or above cooking chamber 104 or otherwise spaced apart from microwave module 122.

Convection module 128 may include a sheathed heater 146 and a convection fan 148. Convection fan 148 is provided for blowing or otherwise moving air over sheathed heater 146 of convection module 128 and into cooking chamber 104 (e.g., for convection cooking).

The specific heating elements of upper and lower heater modules 126 and 124, convection module 128, and magnetron 130 of microwave module 122 can vary from embodiment to embodiment, and the elements and system described above are exemplary only. For example, the upper heater module 126 or convection module 128 can include any combination of heaters including combinations of halogen lamps, ceramic lamps, or sheathed heaters.

As shown, cooking appliance 100 may include a controller 118. Controller 118 of cooking appliance 100 can include one or more processor(s) and one or more memory device(s). The processor(s) of controller 118 can be any suitable processing device, such as a microprocessor, microcontroller, integrated circuit, or other suitable processing device. The memory device(s) of controller 118 can include any suitable computing system or media, including, but not limited to, non-transitory computer-readable media, RAM, ROM, hard drives, flash drives, or other memory devices. The memory device(s) of controller 118 can store information accessible by the processor(s) of controller 118 including instructions that can be executed by the processor(s) of controller 118 in order to execute various cooking operations or cycles (e.g., a meal cook cycle). Controller 118 is communicatively coupled with various operational components of cooking appliance 100, such as components of microwave module 122, upper heater module 126, lower heater module 124, convection module 128, or control panel 112 (e.g., display device 114 or dial 116), the various control buttons, etc. Input/output ("I/O") signals may be routed between controller 118 and control panel 112 as well as other operational components of cooking appliance 100. Controller 118 can execute and control cooking appliance 100 in various cooking operations or cycles, such as precision cooking, which includes meal cook, microwave, induction, or convection/bake modes.

Referring now generally to FIGS. 4 through 8, a roasting assembly 200 may be configured to be removably mounted within the cooking appliance, such as within the cooking chamber thereof, such as within cooking chamber 104 of cooking appliance 100 as described above. As is generally understood by those of ordinary skill in the art, the cooking appliance, such as a microwave oven appliance, e.g., a microwave-only oven appliance with no other heating modules, or a cooking appliance with other or additional heating modules, e.g., heating lamps, convection module, etc., as well as or instead of the microwave module, may include a turntable or rotating platter which can be removably mounted therein. The structure and function of such turntables are well understood by those of ordinary skill in the art and, as such, are not shown or further described herein for the sake of clarity and concision. When the turntable is removed, the roasting assembly 200 of the present disclosure may be installed in its place, e.g., on the ring assembly (see, e.g., FIG. 9) within the cooking chamber of the cooking appliance. As may be seen in FIGS. 4 through 12, the roasting assembly 200 may define an axial direction A (see, e.g., FIGS. 5 and 12), a radial direction R perpendicular to the axial direction A, and a circumferential direction C (see, e.g., FIG. 9) extending around the axial direction A. In some embodiments, the axial direction A may be generally parallel to the vertical direction V, e.g., when the roasting assembly 200 is mounted in the cooking appliance 100.

Figure 4:
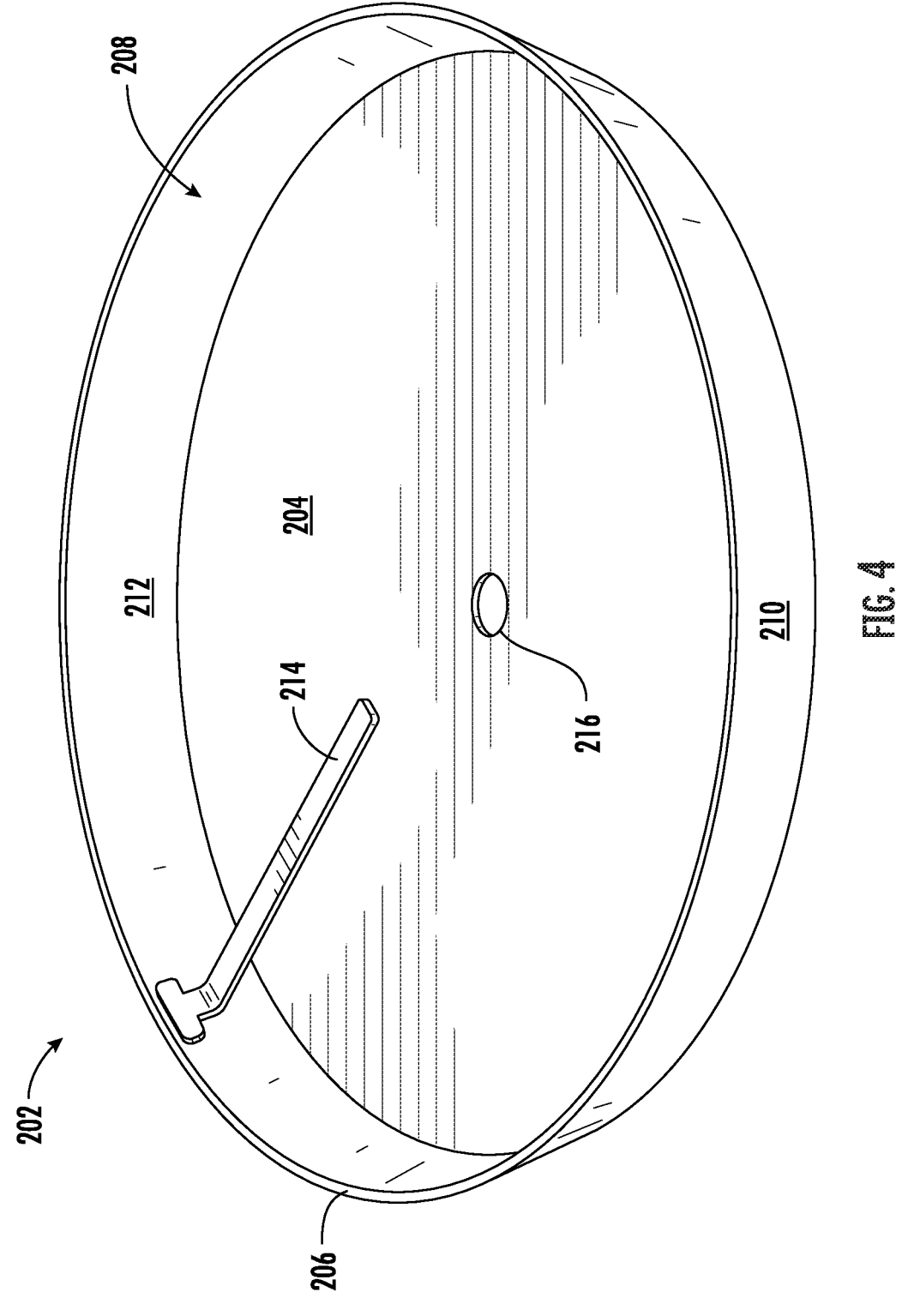
FIG. 4 provides a perspective view of a roasting pan of a roasting assembly according to exemplary embodiments of the present disclosure.

Turning now specifically to FIG. 4, the roasting assembly 200 (see, e.g., FIGS. 7 and 8) may include a pan 202. The pan 202 may include a bottom wall 204 and at least one side wall 206, such as a single curved side wall 206 as in the illustrated embodiment, or multiple linear side walls in additional embodiments. The pan 202, such as the walls 204 and 206 thereof, may define an internal volume 208. For example, food items, such as items to be roasted, e.g., coffee beans, may be disposed in the internal volume 208 of the pan 202 during a cooking operation. As illustrated in FIG. 4, the side wall 206 of the pan 202 includes an outer surface 210 facing away from the internal volume 208 and an inner surface 212 that is generally parallel to and opposite the outer surface 210, e.g., the inner surface 212 faces in an opposite direction from the outer surface 210, such as the inner surface 212 faces the internal volume 208 of the pan 202. In some embodiments, the roasting assembly 200 may also include a stirrer bar 214. The stirrer bar 214 may be mounted to the pan 202, such as to the side wall 206, such as to the internal surface 212 of the side wall 206 of the pan 202. The pan 202 may also include an aperture 216 through the bottom wall 204, such as at about the geometric center of the bottom wall 204. As will be described in more detail below, a threaded post 222 of a rotating body assembly 218 may extend through the aperture 216 and into the internal volume 208 when the roasting assembly 200 is assembled.

Figure 5:
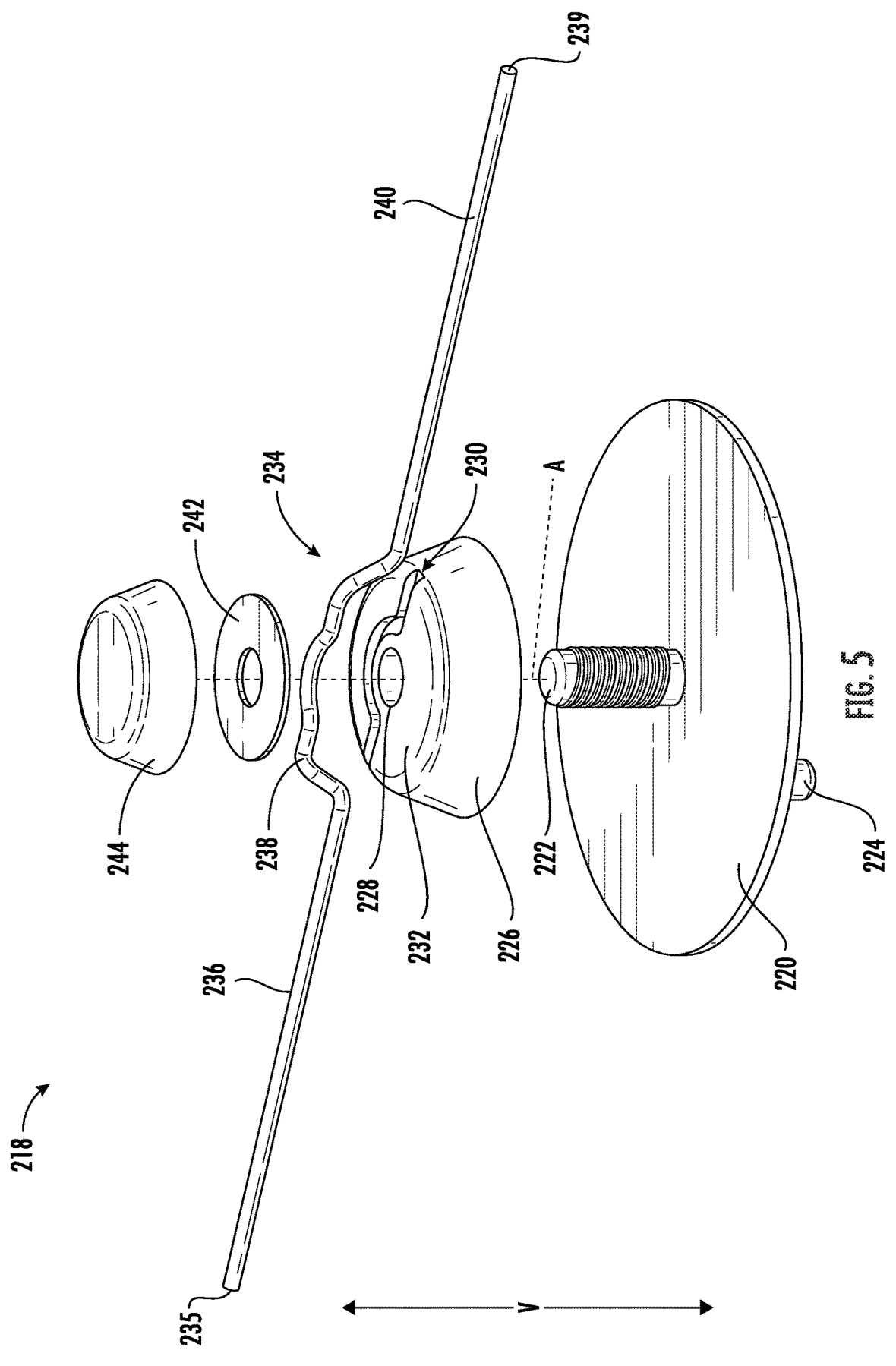
FIG. 5 provides an exploded view of a rotating body assembly of a roasting assembly according to exemplary embodiments of the present disclosure.

FIG. 5 provides an exploded view of the rotating body assembly 218. The rotating body assembly 218 includes a rotating plate 220 with a threaded post 222 extending from the rotating plate 220 on a first side and in a first direction, e.g., upward along a vertical direction V and/or an axial direction A and one or more fingers 224 extending from the rotating plate 220 on a second side opposite the first side and in a second direction opposite the first direction, e.g., downward along the vertical direction V and/or the axial direction A.

In some embodiments, e.g., as illustrated in FIG. 5, the rotating body assembly 218 may further include a rotating cap 226. The rotating cap 226 may be frustoconical in shape. The rotating cap 226 may include a lumen 228 extending longitudinally therethrough, such as along the vertical direction V and/or axial direction A when the roasting assembly 200 is assembled. The rotating cap 226 may thereby be positioned on and around the threaded post 222 with the threaded post 222 extending through the lumen 228 when the roasting assembly 200 is assembled. The rotating cap 226 may further include a groove 230, such as in an upper end 232 of the rotating cap 226. A stirrer rod 234 may be received in the groove 230, e.g., the stirrer rod 234 may include a first end portion 236, a central portion 238, and a second end portion 240. In some embodiments, the central portion 238 of the stirrer rod 234 may be received in the groove 230 of the rotating cap 226. For example, the stirrer rod may extend from a first end 235 defined at the terminus of the first end portion 236 to a second end 239 defined at the terminus of the second end portion 240. Each of the first end portion 236 and the second end portion 240 may be linear, whereas the central portion 238 may be articulated. For example, the groove 230 in the rotating cap 226 may include one or more bends or arcs in order to extend around the lumen 228, and the central portion 238 of the stirrer rod 234 may have a corresponding shape to promote the central portion 238 being received in and fitted with the groove 230.

Still referring to FIG. 5, the rotating body assembly 218 may further include a washer 242 and a cap nut 244. The cap nut 244 may be threaded for engagement with the threaded post 222. For example, the threaded post 222 may extend through and above the rotating cap 226 such that threads, e.g., external threads as illustrated in FIG. 5, of the threaded post 222 extend above the rotating cap 226 for engagement with threads, e.g., internal threads, of the cap nut 244. Thus, as those of ordinary skill in the art will recognize, the cap nut 244 may threadedly engage the threaded post 222, e.g., by screwing the cap nut 244 on to the threaded post 222. With the washer 242, stirrer rod 234, and rotating cap 226 below the cap nut 244 and above the rotating plate 220 (and also above the bottom wall 204 of the pan 202, see, e.g., FIG. 7), the threaded engagement of the cap nut 244 and the threaded post 222 may capture and secure the washer 242, stirrer rod 234, and rotating cap 226 in place in the assembled configuration of the rotating body assembly 218, e.g., within the internal volume 208 of the pan 202.

Figure 6:
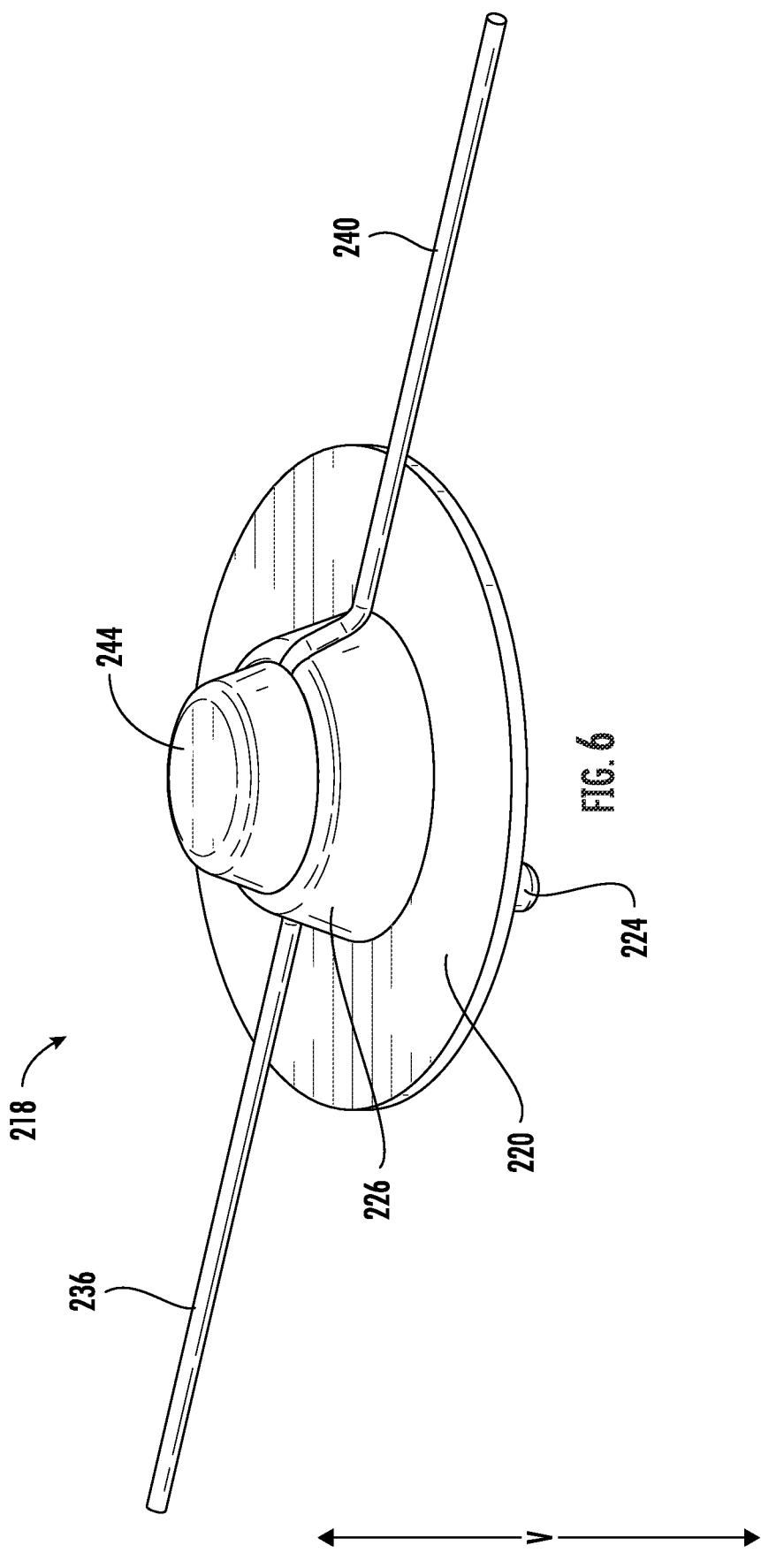
FIG. 6 provides a perspective view of the rotating body assembly of FIG. 5.

FIG. 6 provides a perspective view of the rotating body assembly 218 in the assembled position and in isolation (e.g., without the pan 202) to more clearly show details of the rotating body assembly 218. For example, as may be seen in FIG. 6, when assembled, the first end portion 236 of the stirrer rod 234 extends radially away from the rotating cap 226 in a first direction, and the second end portion 240 of the stirrer rod 234 extends radially away from the rotating cap 226 in a second direction opposite the first direction.

Figure 7:
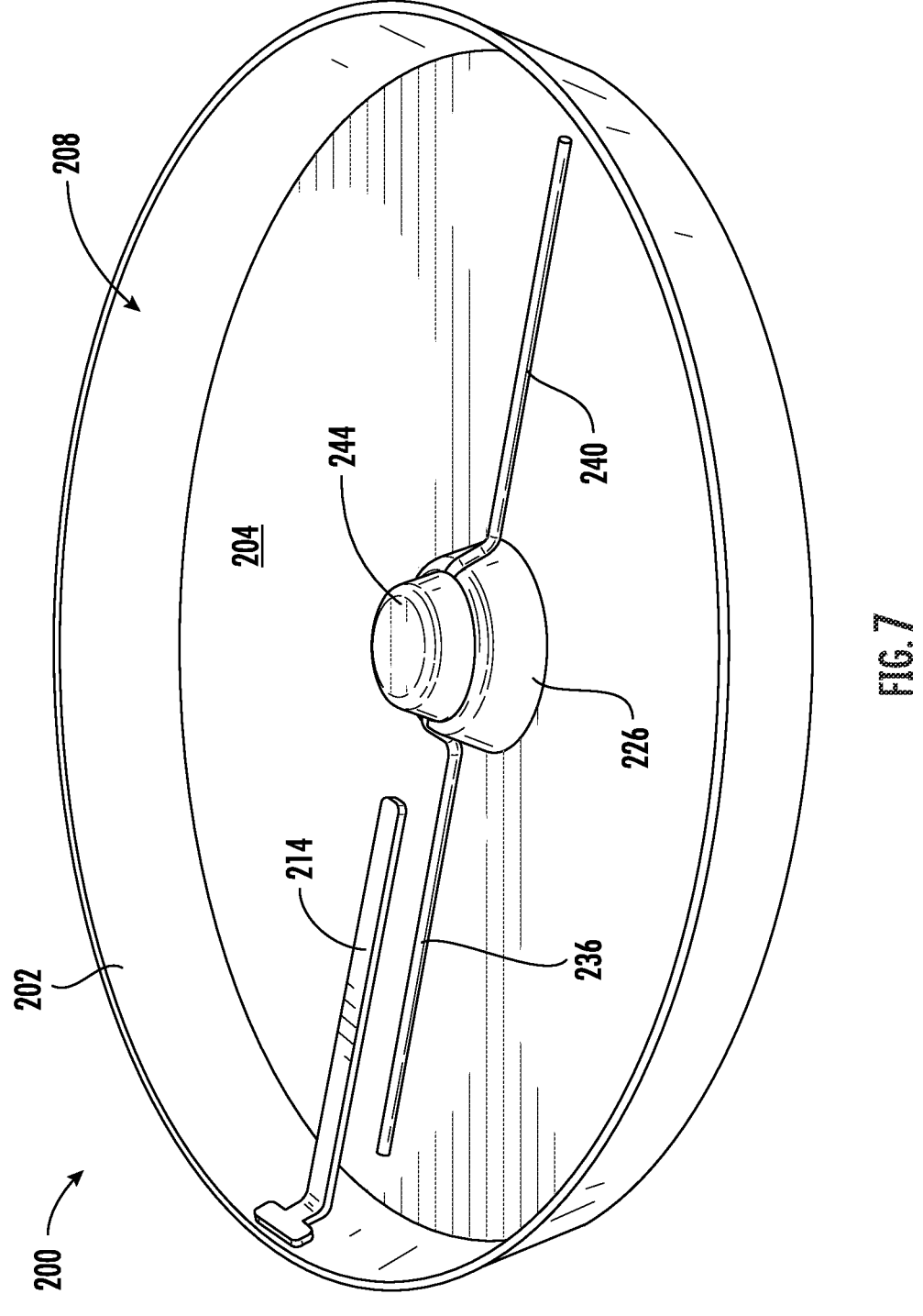
FIG. 7 provides a perspective view of a roasting assembly according to exemplary embodiments of the present disclosure.
Figure 8:
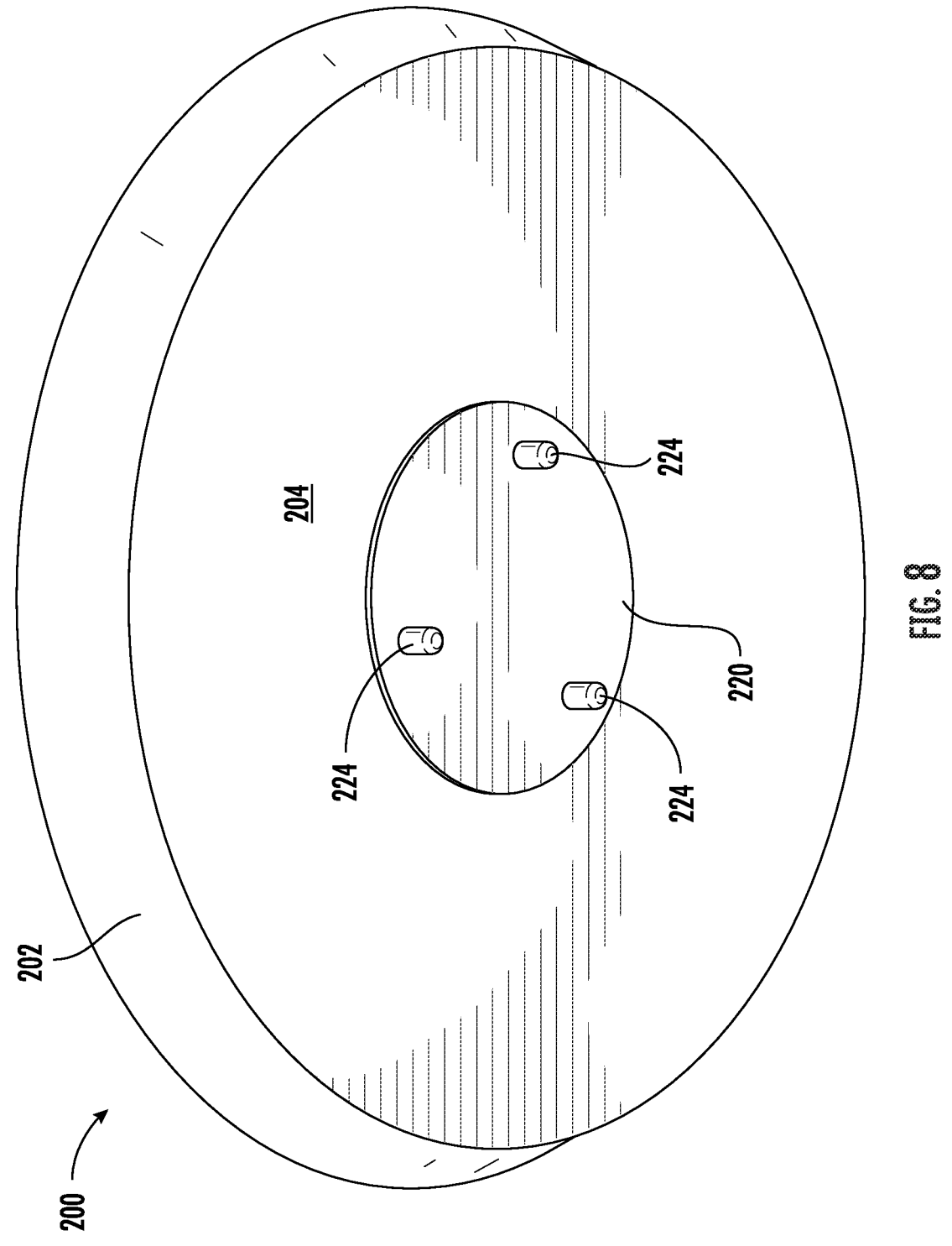
FIG. 8 provides a bottom, perspective view of the roasting assembly of FIG. 7.

FIGS. 7 and 8 provide perspective views of the roasting assembly 200 in a fully assembled position, e.g., with the rotating body assembly 218 mounted to the pan 202. As may be seen in FIG. 8, when so assembled, the rotating plate 220 of the rotating body assembly 218 is positioned below the pan 202, e.g., below the bottom wall 204 of the pan 202 such that the rotating plate 220 is outside of the internal volume 208. As may be seen in FIG. 7, the rotating cap 226 may be mounted on the bottom wall 204 of the pan 202, such as on top of and in contact with the bottom wall 204, whereby the rotating cap 226 is positioned within the internal volume 208 of the pan 202. Also as may be seen in FIG. 7, the stirrer rod 234, such as one of the end portions 236 and 240 thereof, may at least partially overlap with the stirrer bar 214. The stirrer rod 234 may be positioned below the stirrer bar 214, such that the stirrer rod 234 passes underneath the stirrer bar 214 during operation of the cooking appliance 100 with the roasting assembly 200 mounted therein, as will be described in more detail below. The stirrer bar 214 may have a linear, e.g., rectilinear, cross-sectional shape whereas the stirrer rod 234 may have a curved, e.g., circular, cross-sectional shape. Such shapes may promote turning over of food items during stirring, e.g., while the roasting assembly 200 is rotating as will be described in more detail below.

Figure 9:
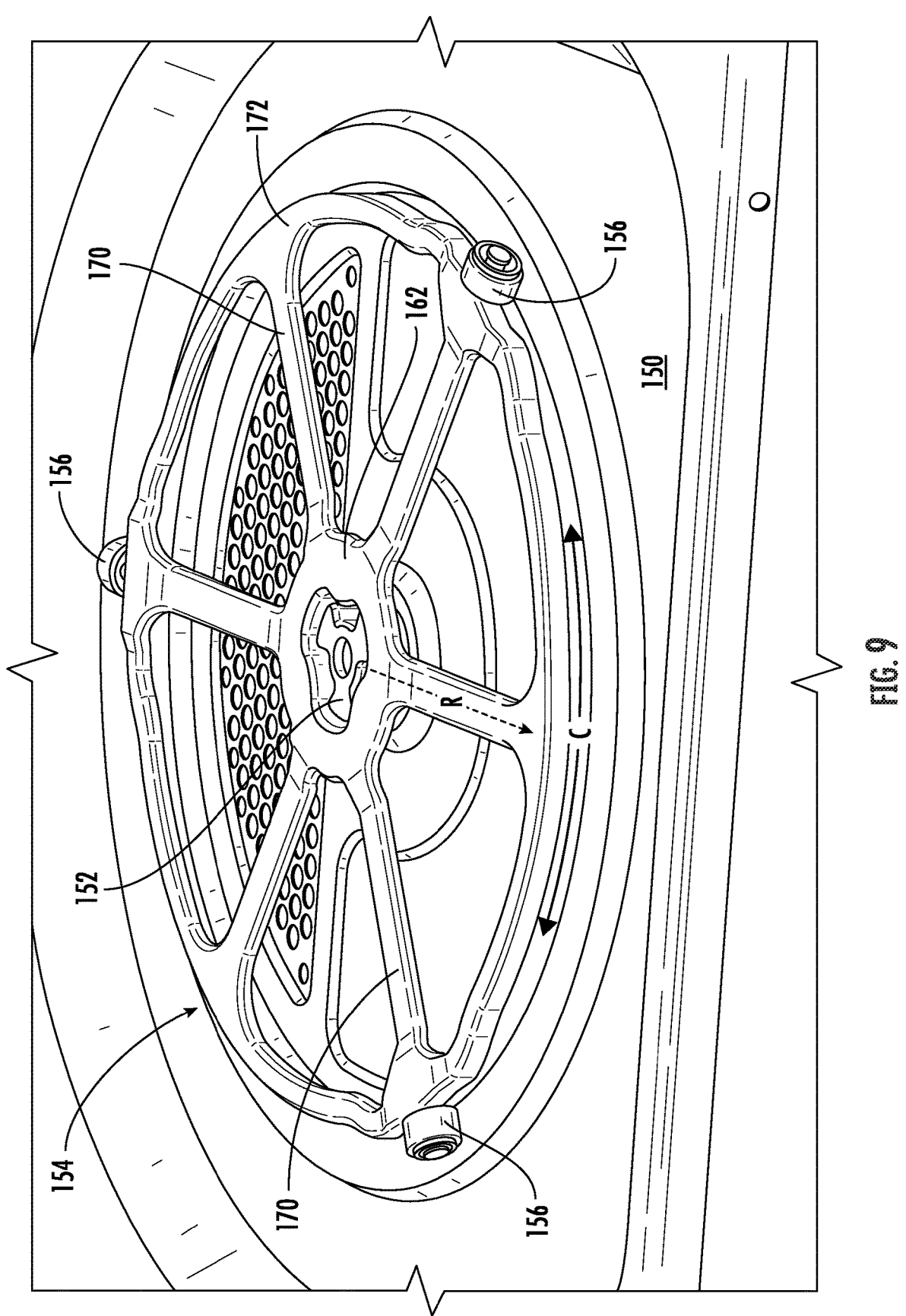
FIG. 9 provides a perspective view of a rotating hub and a ring assembly of a cooking appliance according to exemplary embodiments of the present disclosure.

Referring now to FIG. 9, the cooking appliance 100 may include a rotatable hub 152. For example, rotatable hub 152 may be positioned above a floor 150 of the cooking chamber 104 within cooking chamber 104. A ring assembly 154 may rotatably mounted on the floor 150 of the cooking chamber 104, such as by wheels 156 which rest on the floor 150. Further, the ring assembly 154 may be coupled to the rotating hub 152, such that rotation of the hub 152, e.g., as the hub 152 is driven by a motor 168 (FIG. 12), is imparted to the ring assembly 154. In some embodiments, e.g., as may be seen in FIGS. 9 and 10, the hub 152 may include a plurality of radial spokes 158 that engage with corresponding sockets 160 at a center of the ring assembly 154, whereby the hub 152 and the ring assembly 154 are mutually interengaged, such that the rotation of the hub 152 may be imparted to the ring assembly 154. The ring assembly 154 may include a central body 162, within which the sockets 160 are defined. The ring assembly 154 may further include one or more radial arms 170 which extend radially outward from the central body 162 to an outer ring portion 172. The outer ring portion 172 may extend circumferentially around the entire ring assembly 154, and the wheels 156 may be mounted, such as on radial axles, to the outer ring portion 172 and oriented generally tangential to the circumferential direction C.

Figure 10:
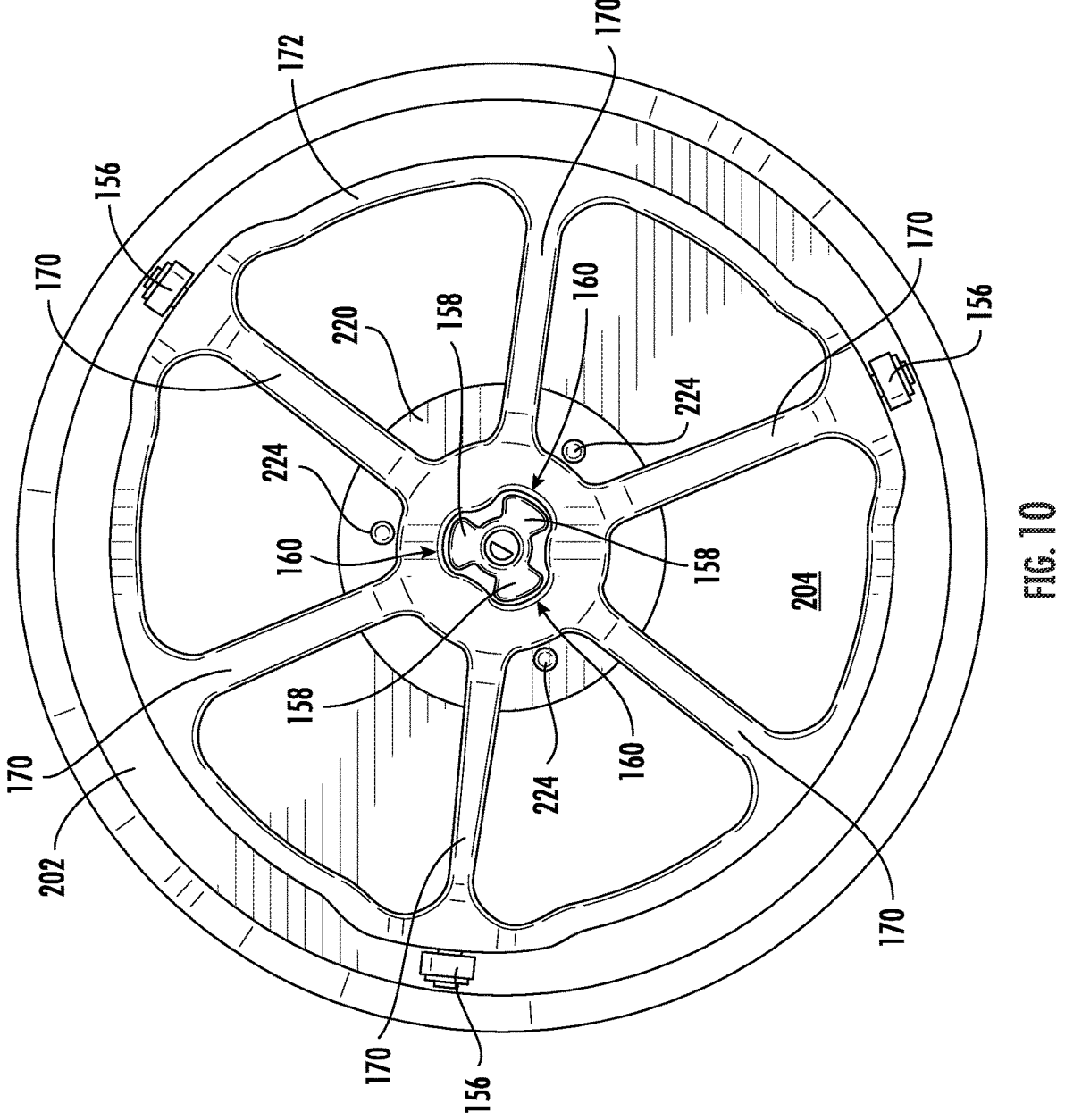
FIG. 10 provides a bottom, perspective view of the roasting assembly of FIG. 7 and the ring assembly of FIG. 9.

FIG. 10 provides a bottom view of the roasting assembly 200 mounted on the rotating hub 152 and ring assembly 154 of the cooking appliance 100. As may be seen in FIG. 10, the fingers 224, e.g., three fingers 224 as in the illustrated embodiment, of the rotating body assembly 218 may extend downward from the rotating plate 220, e.g., in between adjacent arms 170 of the ring assembly 154. As shown in FIG. 10, the rotatable hub 152, ring assembly 154, and roasting assembly 200 are in a static position. When rotating, e.g., when the rotatable hub 152 is driven by a motor 168 (FIG. 12), the arms 170 of the ring assembly 154 will engage, e.g., contact and bear on, the fingers 224 of the rotating body assembly 218, thereby driving rotation of the rotating body assembly 218 within and relative to the pan 202. Also, when the rotating hub 152 turns and thereby turns the ring assembly 154, the wheels 156 of the ring assembly 154 may impart a rotation to the pan 202 as well. As may be seen in FIG. 10, where the rotation of the rotating body assembly 218 is driven by the engagement of the arms 170 and fingers 224 at a first radial distance from the rotatable hub 152, e.g., from a center thereof, and the rotation of the pan 202 is driven by the wheels 156 at a second, larger, radial distance, the rotating body assembly 218 and the pan 202 will rotate at different speeds. For example, the pan 202 may rotate at about three-quarters or less of the speed of the rotating body assembly 218, such as about two-thirds or less of the speed of the rotating body assembly 218, such as about half or less of the speed of the rotating body assembly 218, such as about one-quarter of the speed of the rotating body assembly 218. Thus, due to the differential in the rotation speeds of the pan 202 and the rotating body assembly 218, in particular the stirrer rod 234 of the rotating body assembly 218 within the internal volume 208 of the pan 202, the stirrer rod 234 will rotate relative to the pan 202, and each end portion 236 and 240 of the stirrer rod 234 will periodically pass under the stirrer bar 214, whereupon the stirrer rod 234 and the stirrer bar 214 may cooperatively enhance mixing and/or turning of food items, e.g., coffee beans, being heated, e.g., roasted, within the roasting assembly 200.

Figure 11:
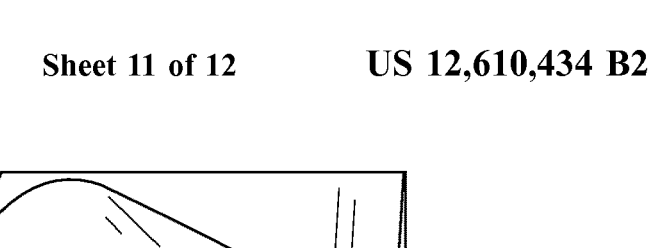
FIG. 11 provides a perspective view of the roasting assembly of FIG. 7 removably mounted in a cooking chamber of a cooking appliance according to exemplary embodiments of the present disclosure.
Figure 12:
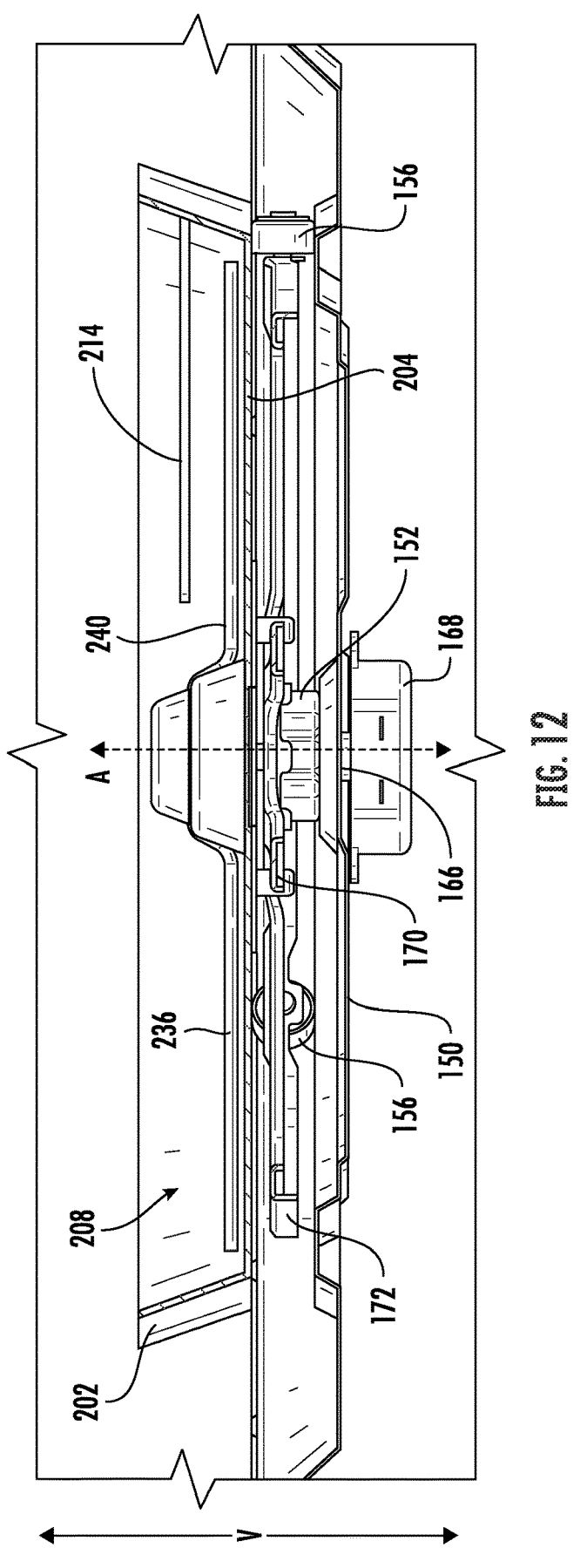
FIG. 12 provides a section view of the roasting assembly and portion of the cooking appliance illustrated in FIG. 11.

FIG. 11 provides a perspective view of the roasting assembly 200 mounted in the cooking chamber 104 of the cooking appliance. FIG. 12 provides a cross-section view through the roasting assembly 200 mounted in the cooking chamber 104, and a portion of the cooking appliance 100, e.g., the floor 150 of the cooking appliance 100 and other components of the cooking appliance 100 adjacent to the floor 150, e.g., above and below the floor 150, as will be described further hereinbelow. As may be seen in FIG. 12, the rotatable hub 152 may be driven by a connected drive shaft 166 and the drive shaft 166 may be motivated by a motor 168. Drive shaft 166 may connect to the motor 168 held below the floor 150. Thus, rotatable hub 152 may be coupled to motor 168. The motor 168 may be communicatively coupled to controller 118 and may be any suitable motor 168 for providing rotational motivating force to the rotatable hub 152. In some exemplary embodiments, the motor 168 may be a stepper motor. The structure and function of motors are generally understood by those of skill in the art and, as such, are not shown or described in further detail herein for the sake of brevity and clarity. As shown in FIG. 12, in some embodiments, the drive shaft 166 may define the axial direction A, such as along and/or parallel to a longitudinal central axis of the drive shaft 166.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking appliance comprising:
   a cabinet defining a cooking chamber;
   a microwave module mounted within the cabinet, the microwave module positioned and configured for delivering microwave energy into the cooking chamber;
   a motor;
   a drive shaft connected to the motor;
   a rotating hub mounted to the drive shaft whereby the motor drives rotation of the rotating hub via the drive shaft;
   a ring assembly rotatably mounted on a floor of the cooking chamber, the ring assembly comprising a central body, an arm extending outward from the central body, and an array of wheels arranged about an outer perimeter of the ring assembly, the ring assembly coupled to the rotating hub at the central body of the ring assembly, whereby rotation of the rotating hub driven by the motor is imparted to the ring assembly;

a pan defining an internal volume, the pan mounted on the ring assembly for rotation therewith, wherein the wheels of the ring assembly contact the floor of the cooking chamber and the pan, whereby rotation of the pan is driven by the wheels of the ring assembly;

a rotating plate positioned below the pan with a finger extending downward from the rotating plate, the finger engaged with the arm of the ring assembly; and a stirrer rod positioned within the internal volume of the pan, the stirrer rod coupled to the rotating hub via the rotating plate and the ring assembly, whereby the stirrer rod rotates with the rotating hub, wherein rotation of the stirrer rod is driven by the engagement of the arm of the ring assembly and the finger of the rotating plate at a first distance from the rotating hub, wherein the pan and the wheels are engaged at a second distance from the rotating hub, the second distance larger than the first distance, whereby the pan rotates at a first speed and the stirrer rod rotates at a second speed greater than the first speed.

2. The cooking appliance of claim 1, wherein the drive shaft defines an axial direction, further comprising a radial direction perpendicular to the axial direction and a circumferential direction extending around the axial direction, wherein the array of wheels are arranged along the circumferential direction about the outer perimeter of the ring assembly.

3. The cooking appliance of claim 1, further comprising a rotating cap mounted on a bottom wall of the pan, wherein the stirrer rod is mounted on the rotating cap.

4. The cooking appliance of claim 3, wherein the rotating cap comprises a groove, a central portion of the stirrer rod is received in the groove of the rotating cap, a first end portion of the stirrer rod extends radially away from the rotating cap in a first direction, and a second end portion of the stirrer rod extends radially away from the rotating cap in a second direction opposite the first direction.

5. The cooking appliance of claim 3, wherein the rotating cap is mounted on a threaded post with a threaded cap nut joined to the threaded post above the rotating cap.

6. The cooking appliance of claim 1, further comprising a threaded post extending from the rotating plate through the bottom wall of the pan.

7. The cooking appliance of claim 1, further comprising a stirrer bar mounted on a side wall of the pan.

8. A roasting assembly configured to be removably mounted within a cooking chamber of a cooking appliance, the roasting assembly comprising:

a pan defining an internal volume, the pan configured to be rotatably mounted on a floor of the cooking chamber of the cooking appliance via an array of wheels of a ring assembly;

a rotating plate positioned below the pan with a finger extending downward from the rotating plate, the finger configured to be engaged with an arm of the ring assembly; and a stirrer rod positioned within the internal volume of the pan, the stirrer rod configured to be coupled to a rotating hub of the cooking appliance via the rotating plate and the ring assembly, whereby the stirrer rod rotates with the rotating hub, wherein the stirrer rod is configured to be rotationally driven by the engagement of the arm of the ring assembly and the finger of the rotating plate at a first distance from the rotating hub wherein the pan is configured to engage the wheels of the ring assembly at a second distance from the rotating hub, the second distance larger than the first distance, whereby the pan rotates at a first speed and the stirrer rod rotates at a second speed greater than the first speed.

9. The roasting assembly of claim 8, wherein the pan is configured to be rotatably mounted atop the ring assembly of the cooking appliance.

10. The roasting assembly of claim 8, further comprising a rotating cap mounted on a bottom wall of the pan, wherein the stirrer rod is mounted on the rotating cap.

11. The roasting assembly of claim 10, wherein the rotating cap comprises a groove, a central portion of the stirrer rod is received in the groove of the rotating cap, a first end portion of the stirrer rod extends radially away from the rotating cap in a first direction, and a second end portion of the stirrer rod extends radially away from the rotating cap in a second direction opposite the first direction.

12. The roasting assembly of claim 10, wherein the rotating cap is mounted on a threaded post with a threaded cap nut joined to the threaded post above the rotating cap.

13. The roasting assembly of claim 8, further comprising a threaded post extending from the rotating plate through the bottom wall of the pan.

14. The roasting assembly of claim 8, further comprising a stirrer bar mounted on a side wall of the pan.

* * * * *